Jan. 26, 1954
A. ERNST
2,667,066
DEVICE FOR TESTING THE HARDNESS OF METALS
Filed Dec. 19, 1951
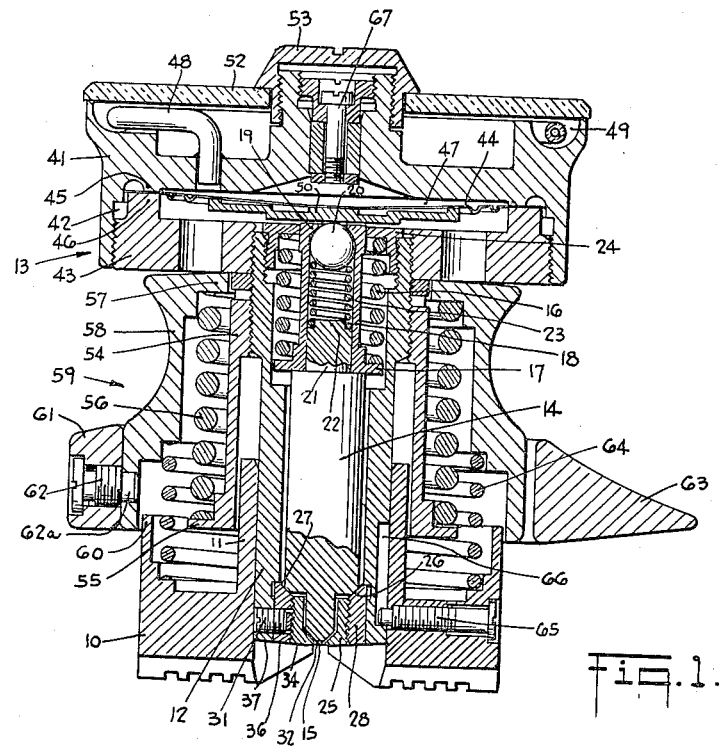
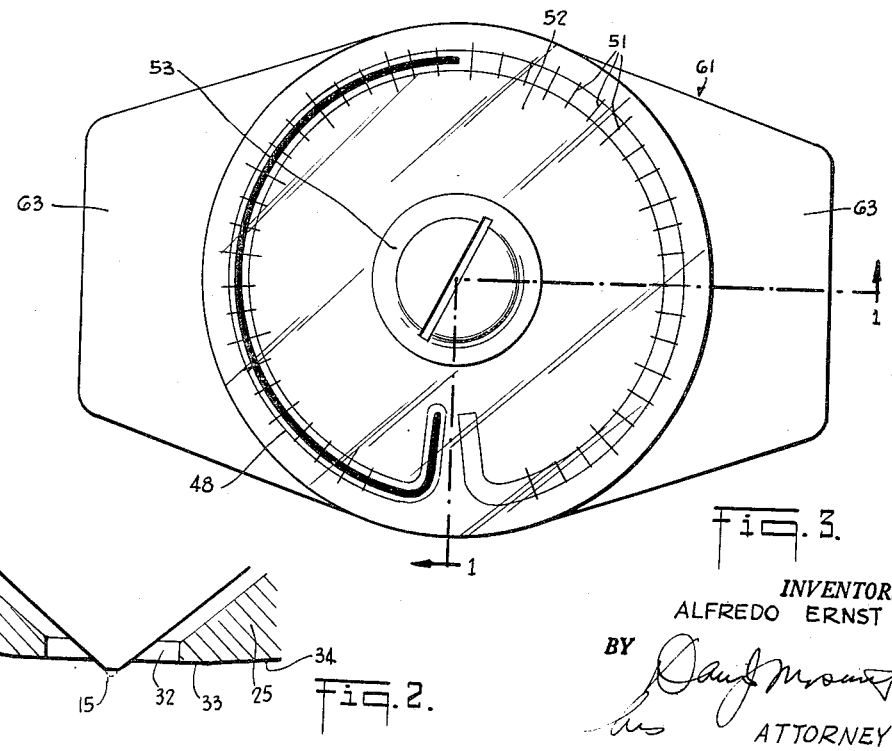
INVENTOR.
ALFREDO ERNST
BY
ATTORNEY Patented Jan. 26, 1954

2,667,066

UNITED STATES PATENT OFFICE 2,667,066

DEVICE FOR TESTING THE HARDNESS OF METALS

Alfredo Ernst, Milan, Italy

Application December 19, 1951, Serial No. 262,387

9 Claims. (Cl. 73—81)

This invention relates to devices for testing the hardness of metals, of the type, for example, shown and described in my copending application, Serial No. 175,829 filed July 25, 1950, of which the present application is in part a continuation.

In hardness testers of the mentioned type, a plunger is pressed manually against the surface of the metal to be tested. An indentor relatively movably associated with the plunger is subjected to a predetermined pressure which produces a degree of penetration of the metal by the indentor depending upon the metal hardness. The position of the indentor relative to the plunger is thus a measure of the metal hardness, means being provided for indicating the relative indentor position on a suitable scale. The predetermined pressure on the indentor is provided by a spring, so that the scale reading is unaffected by the degree of pressure applied to the plunger by the operator.

The present invention is directed to improvements in such devices such that any initial shock, due to manual pressing of the plunger against the metal, does not affect the scale reading. Additionally, an improved centering arrangement for the indentor in the plunger is provided, eliminating the necessity for lapping engaging surfaces of the plunger and indentor to provide an accurate guiding fit. Also, improved means are provided for effecting the initial setting of the indentor relative to the plunger.

For an understanding of the present invention, reference is made to the following description of a typical embodiment thereof as illustrated in the accompanying drawing. In the drawing:

Fig. 1 is a vertical sectional view through a hardness tester embodying the invention, along lines 1—1 of Fig. 3;

Fig. 2 is an enlarged sectional view through the metal engaging ends of the plunger and indentor; and Fig. 3 is a plan view of the tester.

Referring to the drawing, the device comprises a circular base 10 with which is integrally formed an upstanding sleeve 11 in which is slidably mounted a generally tubular plunger 12. The plunger carries at its upper end a head generally indicated at 13, and an indentor 14 having a point 15 at its lower end is mounted reciprocably in a co-axial bore in the plunger 12, indentor 14 being urged downwardly with respect to the plunger 12 by a spring 16 which exerts a predetermined load on the indentor.

Spring 16 is seated on a flange 17 of a sleeve 18 press fitted on a reduced extension 21 of indentor 14, extension 21 having a reduced head 22 forming a positioner for a coil spring 23. The upper end of spring 16 engages a cap 24 threaded into the upper end of plunger 12 and having a sliding fit around sleeve 18. The latter has an inturned flange 19 at its upper end forming a conical seat for a hardened steel ball 20 pressed against flange 19 by spring 23.

The lower end of indentor 14, inwardly of point 15, has a circumferential shoulder 26 bevelled at an angle of 22½° to the indentor axis. This bevelled shoulder engages the similarly bevelled or sloped upper end 27 of a ring member 28 press fitted into the lower end of plunger 12. An adjustable centrally apertured seat 25, having a loose fit around point 15, is threaded into member 28.

Adjustment of seat 25 in member 28 pre-sets the amount point 15 of indentor 14 projects beyond the lower end of plunger 12. Seat 25 is held in adjusted position by a set screw 31 threaded through the member 28 to engage seat 25. For a short distance around its aperture 32, the seat 25 has a flat metal engaging surface 33 perpendicular to the axis of indentor 14. Beyond this flat surface, the lower face of the seat is slightly tapered or relieved upwardly, as at 34, this taper being parallel to similarly tapered surfaces 36, 37 on member 28 and the lower end of plunger 12.

The bevelled surfaces 26, 27 provided a self-centering engagement between indentor 14 and plunger 12, the diameter of the indentor being substantially less than the inside diameter of plunger 12, so that the indentor and plunger are in engagement only at the surfaces 26, 27. The described construction eliminates the necessity for lapping the longitudinally extending juxtaposed surfaces of the indentor and plunger.

The head 13 comprises a part 41 having a recess 42 on its underside, the recess being closed by a disc 43 which is screw threaded on its edge to engage a screw thread on the circumferential wall of the recess, and has a screw-threaded central aperture to receive the screw-threaded upper end of the plunger 12. A flexible diaphragm 44 is clamped between annular ribs 45 and 46 formed in the recess 42 and on the disc 43 respectively, and constitutes a movable lower wall for a liquid chamber 47 to which is connected a tube 48 of small bore, the tube, which is of transparent material such as glass, being so shaped as to lie in an annular groove 49 extending around the upper surface of the head 13. The liquid chamber is filled with liquid, which extends into the tube, the other end of the tube having a restricted opening to the atmosphere.

The ball 20 bears against a rigid metal disc 50 which is soldered to the underside of the diaphragm, and it will be seen that relative movement of the punch 14 and the plunger 12 will cause a change in volume of the liquid chamber 47, thus producing a movement of liquid in the tube which can be measured on a scale 51 engraved on the underside of a cover 52 of transparent plastic molding material clamped to the head by a central screw cap 53.

The spring 23 is about one-half pound stronger than diaphragm 44. Normally, the ball 20 biased by spring 23 maintains cap 24 and sleeve 18 out of engagement with disc 50. If the instrument is applied with a shock to the test metal, and if the shock is greater than such half-pound tension difference, the ball 20 and spring 23 absorb the shock so that no shock waves are transmitted to point 15 and the scale reading will not be affected by the shock.

A sleeve 54, internally screw-threaded at its upper end, is screwed at that end on to the plunger, the sleeve 54 extending downwardly around the sleeve 11 of the base, and having an external flange 55 at its lower end to provide an abutment for the lower end of a coiled spring 56. The spring 56 engages at its upper end with an internal flange 57 on the body part 58 of a manual pressure member 59, the body part 58 being of tubular form and extending downwardly around the base 10. The spring 56 urges the body part 58 of the manual pressure member upwardly against the underside of the disc 43, and is compressed during assembly of the device to such a degree that it yields to permit the part 57 to move away from the disc 43 when a pressure slightly greater than that needed to compress the spring 16 is exerted on the manual pressure member. Downward movement of the manual pressure member is limited by an upwardly projecting rim 60 on the base 10, the arrangement being such that this rim 60 is engaged by the manual pressure member before the spring 56 is fully compressed.

The manual pressure member includes, in addition to the body part 58, a part 61 which is pivotally attached to the body part by means of set screws 62, threaded into part 61 and having pivot extensions 62a entering recesses in part 58. The pivot axis of the part 61 is perpendicular to, and intersects the axis of, the plunger 12. The part 61 has two opposite laterally projecting wings 63, the center line of which is perpendicular to the pivot axis of the part.

A third spring 64 arranged between the base 10 and the body part 58 of the manual pressure member urges the manual pressure member and plunger upwardly with respect to the base, such upward movement being limited by a stop screw 65 mounted in the base and projecting into a slot 66 in the plunger.

A screw-threaded plug 67 mounted in the head 13 below the screw cap 53 provides a means for varying the volume of the liquid chamber 47 to adjust the zero reading of the device.

The base, plunger, head and sleeve of the device are conveniently made of steel, while the parts of the manual pressure member may be of brass or other metal, or may be molded in a synthetic resinous molding product.

In use, the base of the device is placed on the surface of the material, the hardness of which is to be determined, and pressure is applied by the operator's hands to the wings 63 of the manual pressure member, thus pressing the plunger 12 down into contact with the surface of the material. The pressure exerted on the plunger is limited by the spring 56. The indentor 14, being urged downwardly relative to the plunger by the spring 16, penetrates the material to an extent dependent on the hardness of the latter and the loading of the spring 16. The volume of the liquid chamber 47 is thus decreased by an amount dependent on the degree of penetration, and the column of liquid in the tube 43 is increased in length, the increase being readable on the scale, which is calibrated in accordance with any desired scale of hardness measurement.

The flat surface 33 of seat 25 is the only part of the plunger assembly engaging the test metal, the relieved surfaces 34, 36, 37 remaining out of contact therewith. This flat 33 may be, for example, about 0.07″ in diameter, and the point 15 of indentor 14 may have an included angle of 100° and may be integral with the indentor.

The particular advantage of arranging the indentor and plunger to engage only at the surfaces 26, 27 is that more accurate hardness measurements are obtained in the event the applied pressure is not applied in an absolutely vertical direction. With the tight sliding fit hitherto provided between the indentor and plunger, the increased friction between the parts deteriorated from the accuracy of the indications.

It will be understood that if the spring 56 were not included, the operator would be dependent entirely on his own judgment for determining what pressure was being exerted on the plunger, and he would not be sure that the plunger was, in fact, in contact with the material being tested, or whether he was exerting such a high pressure that the plunger itself was producing slight indentation of the material. With the illustrated arrangement, the operator can safely exert the maximum pressure of which he is capable, the spring 56 yielding when the desired pressure on the plunger is exceeded.

While a specific embodiment of the invention has been shown and described in detail as to illustrate the application of the invention principles, it will be understood that the invention may be embodied otherwise without departing from such principles.

What is claimed is:

1. A metal hardness tester comprising, in combination, a plunger, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by relative movement of said indentor and said plunger, second resilient means interposed between the plunger and the manual pressure applying means, said second resilient means, being preloaded in an amount sufficient to transmit, without yielding, a maximum thrust greater than the load applied to said indentor by said first resilient means, and shock absorbing means interposed between the other end of said indentor and said indicating means.

2. A metal hardness tester comprising, in combination, a plunger, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by relative movement of said indentor and said plunger and including a resilient element engageable by the other end of said indentor, second resilient means interposed between the plunger and the manual pressure applying means, said second resilient means being preloaded in an amount sufficient to transmit, without yielding, a maximum thrust greater than the load applied to said indentor by said first resilient means, and shock absorbing means interposed between the other end of said indentor and said resilient element.

3. A metal hardness tester comprising, in combination, a plunger, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by relative movement of said indentor and said plunger and including a resilient element engageable by the other end of said indentor, second resilient means interposed between the plunger and the manual pressure applying means, said second resilient means being preloaded in an amount sufficient to transmit, without yielding, a maximum thrust greater than the load applied to said indentor by said first resilient means, and shock absorbing means mounted in the other end of said indentor and engaging said element, said shock absorbing means normally urging said indentor away from said element.

4. A metal hardness tester comprising, in combination, a plunger, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by relative movement of said indentor and said plunger and including a resilient element engageable by the other end of said indentor, second resilient means interposed between the plunger and the manual pressure applying means, said second resilient means being preloaded in an amount sufficient to transmit, without yielding, a maximum thrust greater than the load applied to said indentor by said first resilient means, and shock absorbing means including a ball mounted in the other end of said indentor and resilient means biasing said ball outwardly of said indentor into engagement with said element, said shock absorbing means normally urging said indentor away from said element.

5. A metal hardness tester comprising, in combination, a base, a plunger slidably mounted in said base, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by movement of said indentor and said plunger, second resilient means interposed between the plunger and the manual pressure applying means, said second resilient means being preloaded in an amount sufficient to transmit, without yielding, a maximum thrust greater than the load applied to said indentor by said first resilient means, shock absorbing means interposed between the other end of said indentor and said indicating means, and third resilient means interposed between said base and said manual pressure applying means acting to lift said manual pressure applying means and said plunger relative to said base.

6. A metal hardness tester comprising, in combination, a base, a plunger slidably mounted in said base, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by relative movement of said indentor and said plunger and including a resilient element engageable by the other end of said indentor, second resilient means interposed between the plunger and the manual pressure applying means, said second resilient means being preloaded in an amount sufficient to transmit, without yielding, a maximum thrust greater than the load applied to said indentor by said first resilient means, shock absorbing means including a ball mounted in the other end of said indentor and resilient means biasing said ball outwardly of said indentor into engagement with said element, said shock absorbing means normally urging said indentor away from said element, and third resilient means interposed between said base and said manual pressure applying means acting to lift said manual pressure applying means and said plunger relative to said base.

7. A metal hardness tester comprising, in combination, a plunger, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by relative movement of said indentor and said plunger, second resilient means interposed between the plunger and the manual pressure applying means, said second resilient means being preloaded in an amount sufficient to transmit, without yielding, a maximum thrust greater than the load applied to said indentor by said first resilient means, and shock absorbing means interposed between the other end of said indentor and said indicating means, said indentor being loosely mounted within said plunger and having an inverted frusto-conical shoulder engaged with an inverted frusto-conical seat in said plunger to effect axial alignment of said indentor and said plunger.

8. A metal hardness tester comprising, in combination, a plunger, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by relative movement of said indentor and said plunger and including a resilient element engageable by the other end of said indentor, second resilient means interposed between the plunger and the manual pressure applying means, said second resilient means being preloaded in an amount sufficient to transmit, without yielding, a maximum thrust greater than the load applied to said indentor by said first resilient means, a ring member press fitted into said one end of said plunger and having a frusto-conical seat on its inner edge, said indentor having a reduced extension through said ring with a conical outer end forming such projecting indentor end and having a frusto-conical shoulder engaging said frusto-conical seat to coaxially align said plunger and indentor, and an apertured adjustment member threaded into said ring member and partially embracing said conical outer end to pre-set the relative projection of said indentor outwardly of said plunger.

9. A metal hardness tester comprising, in combination, a plunger, means for applying manual pressure to said plunger to press one end thereof against a metal surface the hardness of which is to be tested, an indentor reciprocably mounted within said plunger, first resilient means interposed between said plunger and said indentor and urging said indentor to a position in which one end thereof projects beyond said one end of said plunger, indicating means operated by relative movement of said indentor and said plunger and including a resilient element engageable by the other end of said indentor, second resilient means interposed between the plunger and the manual pressure applying means, said second resilient means being preloaded in an amount sufficient to transmit, without yielding, a maximum thrust greater than the load applied to said indentor by said first resilient means, a ring member press fitted into said one end of said plunger and having a frusto-conical seat on its inner edge, said indentor having a reduced extension through said ring with a conical outer end forming such projecting indentor end and having a frusto-conical shoulder engaging said frusto-conical seat to coaxially align said plunger and indentor, and an apertured adjustment member threaded into said ring member and partially embracing said conical outer end to pre-set the relative projection of said indentor outwardly of said plunger, said adjustment member having a small area flat seating surface around the conical outer end and surrounded by an inverted frusto-conical surface.

ALFREDO ERNST.

References Cited in the file of this patent

UNITED STATES PATENTS

| Number | Name | Date |
| --- | --- | --- |
| 1,661,718 | Davis | Mar. 6, 1928 |
| 2,411,779 | Dillon et al. | Nov. 26, 1946 |
| 2,536,632 | Ernst | Jan. 2, 1951 |

FOREIGN PATENTS

| Number | Country | Date |
| --- | --- | --- |
| 239,409 | Switzerland | Jan. 16, 1946 |
| 169,294 | Austria | Oct. 25, 1951 |